US008665064B1

(12) United States Patent
Rodenbeck et al.

(10) Patent No.: US 8,665,064 B1
(45) **Date of Patent: *Mar. 4, 2014**

(54) WIRELESS SECURITY CONTROL SYSTEM

(75) Inventors: Robert Wilmer Rodenbeck, Indianapolis, IN (US); Roger Keith Russell, Indianapolis, IN (US); Michael Lee Long, Fishers, IN (US)

(73) Assignee: Stanley Security Solutions, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,049

(22) Filed: Sep. 11, 2012

Related U.S. Application Data

(63) Continuation of application No. 10/803,434, filed on Mar. 18, 2004, now Pat. No. 8,264,322, which is a continuation of application No. 09/523,670, filed on Mar. 10, 2000, now Pat. No. 6,720,861.

(60) Provisional application No. 60/124,324, filed on Mar. 12, 1999.

(51) Int. Cl.
*G06F 7/00* (2006.01)

(52) U.S. Cl.
USPC .......... 340/5.64

(58) Field of Classification Search
USPC .......... 340/5.64, 542, 10.4, 12.24; 70/264, 91
See application file for complete search history.

(56) References Cited

U.S. PATENT DOCUMENTS 4,216,375 A 8/1980 Ulch et al.
4,218,690 A 8/1980 Ulch et al.
4,367,458 A 1/1983 Hackett
4,462,022 A 7/1984 Stolarczyk
4,544,832 A 10/1985 Young et al.
4,584,569 A 4/1986 Lopez et al.
4,661,804 A 4/1987 Abel
4,721,954 A 1/1988 Mauch
4,839,640 A 6/1989 Ozer et al.
4,855,713 A 8/1989 Brunius
5,083,122 A 1/1992 Clark
5,239,692 A 8/1993 Kim
5,276,680 A 1/1994 Messenger
5,298,883 A 3/1994 Pilney et al.
5,321,963 A 6/1994 Goldman
RE35,336 E 9/1996 Ulch et al.
RE35,364 E 10/1996 Heitschel et al.

(Continued)

FOREIGN PATENT DOCUMENTS

AU 200071577 5/2001
JP 2000303729 10/2000

(Continued)

*Primary Examiner* — Vernal Brown

(74) *Attorney, Agent, or Firm* — Faegre Baker Daniels LLP

(57) ABSTRACT

A security control system includes a remote access control system to receive wireless information from a central access control system. The remote access control system includes a remote access controller electrically coupled to a remote wireless communicator. The remote access controller receives information from the remote wireless communicator and uses the information to control locking and unlocking of the door. The remote wireless communicator also transmits wireless information to the central access control system and a switch is provided for selectively choosing between the receiving and transmitting the wireless information. The remote wireless communicator communicates via RF information, such as spread-spectrum RF. The remote access control system also includes a reader to read user data when presented to the reader.

26 Claims, 3 Drawing Sheets

(56) References Cited

U.S. PATENT DOCUMENTS

| | | | | |
|---|---|---|---|---|
| 5,602,536 | A | 2/1997 | Henderson et al. | |
| 5,619,191 | A | 4/1997 | Lambropoulos et al. | |
| 5,625,338 | A | 4/1997 | Pildner et al. | |
| 5,677,682 | A | 10/1997 | Thorsen et al. | |
| 5,712,973 | A | 1/1998 | Dayan et al. | |
| 5,767,791 | A | 6/1998 | Stoop et al. | |
| 5,774,058 | A | 6/1998 | Henry et al. | |
| 5,805,063 | A | 9/1998 | Kackman | |
| 5,809,013 | A | 9/1998 | Kackman | |
| 5,823,028 | A | 10/1998 | Mizuno et al. | |
| 5,907,279 | A | 5/1999 | Bruins et al. | |
| 5,923,264 | A | 7/1999 | Lavelle et al. | |
| 5,936,544 | A | 8/1999 | Gonzales et al. | |
| 5,936,960 | A | 8/1999 | Stewart | |
| 5,942,985 | A | 8/1999 | Chin | |
| 5,950,110 | A | 9/1999 | Hendrickson | |
| 5,970,227 | A | 10/1999 | Dayan et al. | |
| 6,005,306 | A | 12/1999 | Pickard | |
| 6,072,402 | A | 6/2000 | Kniffin et al. | |
| 6,161,005 | A | 12/2000 | Pinzon | |
| 6,177,861 | B1 | 1/2001 | MacLellan et al. | |
| 6,233,588 | B1 | 5/2001 | Marchoili et al. | |
| 6,344,797 | B1 | 2/2002 | Hosny | |
| 6,359,547 | B1 | 3/2002 | Denison et al. | |
| 6,420,961 | B1 | 7/2002 | Bates et al. | |
| 6,720,861 | B1 * | 4/2004 | Rodenbeck et al. | 340/5.64 |
| 7,019,614 | B2 | 3/2006 | Lavelle et al. | |
| 8,264,322 | B2 * | 9/2012 | Rodenbeck et al. | 340/5.64 |
| 2008/0129444 | A1 | 6/2008 | Nassimi | |

FOREIGN PATENT DOCUMENTS

| | | |
|---|---|---|
| JP | 2002082914 | 3/2002 |
| JP | 2003184378 | 7/2003 |
| JP | 2004011329 | 1/2004 |
| JP | 2008009600 | 11/2008 |
| KR | 2002085132 | 11/2002 |
| KR | 2004018686 | 3/2004 |
| KR | 2005010546 | 1/2005 |
| KR | 2005109092 | 11/2005 |
| KR | 2005120192 | 12/2005 |
| KR | 620917 | 9/2006 |
| KR | 711214 | 4/2007 |
| TW | 200741598 | 11/2007 |
| WO | WO 2004/011746 | 2/2004 |

* cited by examiner

WIRELESS SECURITY CONTROL SYSTEM

RELATED APPLICATIONS

This application is a continuation of U.S. patent application Ser. No. 10/803,434, filed Mar. 18, 2004, now U.S. Pat. No. 8,264,322, which is a continuation of U.S. patent application Ser. No. 09/523,670, now U.S. Pat. No. 6,720,861, filed Mar. 10, 2000, which claims the benefit of Provisional Application Ser. No. 60/124,324, filed Mar. 12, 1999, the disclosures of which are expressly incorporated by reference herein.

BACKGROUND AND SUMMARY OF THE INVENTION

The present invention relates to a security control system. More particularly, the present invention relates to a wireless security control system that grants or denies access to a user seeking access through a door.

In the access control and security industries, there are two types of access control systems: on-line systems and standalone systems. On-line systems perform access grant and deny functions and history recording and provide continuous monitoring of a secured door or portal with nearly instantaneous updating of user access privileges. Standalone systems perform many of the basic functions of on-line systems (access grant & deny, history recording, etc.) but generally do not provide continuous monitoring or instantaneous updating of user access privileges.

On-line systems cost three to four times more than standalone systems mainly because hard-wired connections are required to connect readers, sensors, and locking devices at the door to either a "panel" or central computer. The use of wires allows for continuous monitoring and instantaneous updating of user data, but at an inflated cost. Standalone systems maintain a cost advantage by being battery-powered and avoiding the use of wires. The main disadvantage of traditional Standalone systems is that if the user data needs to be updated, an individual must walk to and physically connect to the Standalone systems. Once connected, new user data can be downloaded into the system via a laptop, palmtop, or custom programming device.

Through the use of wireless radio frequency ("RF") technology, the present standalone security systems can perform user data updates and some monitoring on an as required basis. For RF wireless technology to be effectively implemented on standalone systems, battery power must be conserved. In preferred embodiments, the standalone system should maintain an appealing physical appearance. For example, any antennas should be hidden or unobtrusive.

A remote access control system includes a remote wireless communicator to receive wireless information from a central access control system. It also includes a remote access controller electrically coupled to the remote wireless communicator. The remote access controller would receive information from the remote wireless communicator and uses the information to control locking and unlocking of the door. The remote wireless communicator includes an antenna. A receiver housing is providing having an inner portion mounted to the inside of the door and an outer portion mounted outside of the door. The antenna is mounted to the outer portion of the housing and the remote wireless communicator and remote access controller are mounted to the inner portion of the housing. The remote wireless communicator also transmits wireless information to the central access control system and a switch is provided for selectively choosing between the receiving and transmitting the wireless information. A local communication port is coupled to the remote access controller to provide wired communication from a portable device. The remote wireless communicator communicates via RF information and preferably spread-spectrum RF.

The remote access control system also includes a reader to read user data when presented to the reader. The remote access controller determines whether the data is valid to control the locking and unlocking of the door. A battery is coupled to the reader, the remote access controller and the remote wireless communicator. The remote access communicator selectively connects the battery to the remote wireless communicator to conserve energy. The reader is mounted to the outer portion of the housing. The user data is provided on a token control card presented to the reader.

The central access security system includes the remote access system and a central access control system. The central access control system has a central access controller and a central wireless communicator. The central wireless communicator communicates with the remote wireless communicator. The central access controller is coupled to the central access communicator by a bus. The bus may be a wired network using network protocol, fiber optics, or a wireless bus. The system may include a plurality of central wireless communicators coupled to the bus and the central access controller. Each central wireless communicator may communicate wirelessly with one or more remote wireless communicators.

Other objects, advantages and novel features of the present invention will become apparent from the following detailed description of the invention when considered in conjunction with the accompanying drawings.

DETAILED DESCRIPTION OF THE DRAWINGS

Figure 1:
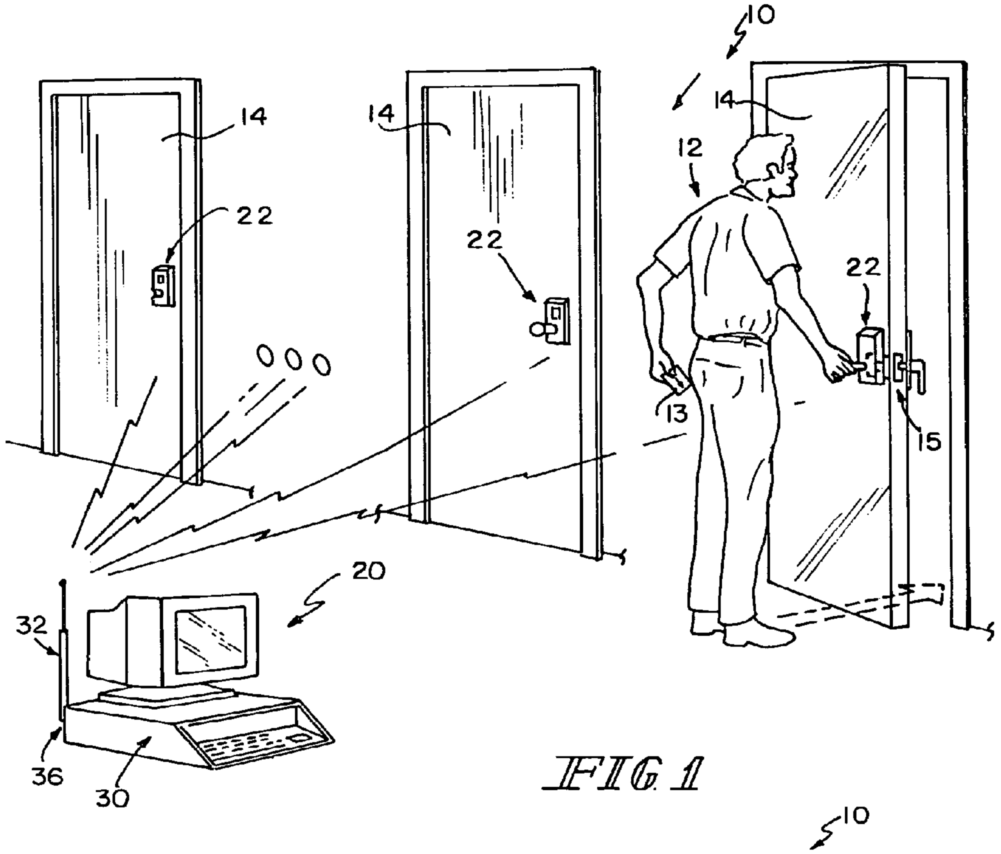
FIG. 1 is a diagrammatical view of a wireless security control system showing the wireless security control system including a central access control system and a plurality of remote access control systems or locksets mounted to a plurality of doors located remotely from the central access control system, the remote access control systems being configured to control the locking and unlocking of the respective door to allow only users having a valid token to pass through the door, and showing the central access control system communicating wirelessly with one or more of the remote access control systems to program the respective remote access control system and/or to receive user access information from the respective remote access control system.

A wireless security control system 10 is shown in FIG. 1. The wireless security control system 10 controls whether a particular user 12 will be granted or denied access through a particular door 14. As shown in FIG. 1, user 12 is granted access by the wireless security control system 10 to pass through one of the doors 14 because user 12 properly presented a valid user data on a token 13 for example, to a remote access control system 22 mounted on door 14 which allowed user 12 to open door 14.

The wireless security control system 10 of the present invention includes a central access control system 20 and a plurality of remote access control systems 22 located remotely from central access control system 20. The central access control system 20 uses wireless communication technology to communicate with each remote access control system 22. The central access control system 20 can therefore be used to program each remote access control system 22 so that certain users are granted access through certain doors 14 and other users 12 are granted access through other doors 14. The central access control system 20 can also receive information from each remote access control system 22 so that user access information such as the time and date that a particular user 12 was granted access through door 14 can be tracked and monitored.

Each remote access control system or electronic lockset 22 is mounted to a respective door 14 to control whether the particular user 12 is granted or denied access through the particular door 14, as shown in FIG. 1. Remote access control system 22 will grant user 12 access through door 14 if user 12 properly presents valid user data for example on a token 13 to remote access control system 22. If the data on token 13 is deemed by remote access control system 22 to be valid, a lock mechanism 15 mounted to door 14 will be unlocked and the user will be granted access to pass through door 14, as shown in FIG. 1. However, if remote access control system 22 deems user data on token 13 to be invalid, or if token 13 is not properly presented to remote access control system 22, lock mechanism 15 on door 14 will remain locked and user 12 will not be granted access through door 14.

Figure 2:
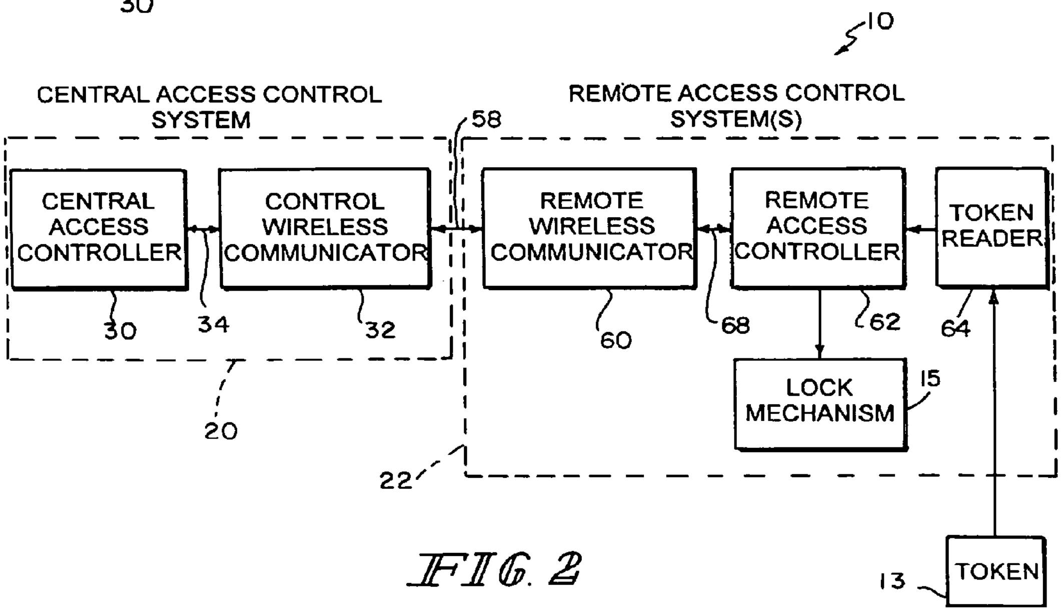
FIG. 2 is a block diagram of the wireless security control system of FIG. 1 showing the central access control system of FIG. 1 having a central access controller and a central wireless communicator and each remote access control system of FIG. 1 having a remote wireless communicator, a remote access controller, a lock mechanism, and a token reader, the token reader being configured to read token data from the token, the remote access controller being configured to lock and unlock the lock mechanism, and the central and remote wireless communicators being configured to communicate information wirelessly between the central access controller and the remote access controller.

As shown illustratively in FIG. 1 and diagrammatically in FIG. 2, central access control system 20 includes a central access controller 30, a central wireless communicator 32, and a power and/or signal bus 36 that electrically interconnects central access controller 30 and central wireless communicator 32. Central wireless communicator 32 allows information to be communicated wirelessly between central access controller 30 and each remote access controller 22. The central access controller 30 is configured to communicate bidirectionally with one or more central wireless communicators 32, as shown in FIG. 2 by a double-headed arrow 34 interconnecting central access controller 30 and central wireless communicator 32. This bidirectional communication allows information to be transmitted from central access controller 30 to central wireless communicator 32 and/or received by central access controller 30 from central wireless communicator 32.

As shown in FIG. 1, bus 36 can simply be a hard wire connection between central access controller 30 and central wireless communicator 32. However, as shown diagrammatically in FIG. 4, bus 36 can also electrically interconnect central access controller 30 and central wireless communicator 32 using RF technology, fiber optics, coaxial cable, A/C power line, regular wire, twisted pair wire, or any other suitable electrical connection. A variety of different protocols such as CE bus, LON works<, TCP/IP, IPX/SPX, or custom protocols, can be used to transfer information from central access controller 30 to a plurality central wireless communicators 32 over one of the electrical connections mentioned above. Each central wireless communicator 32 communicates wirelessly with one or more remote access control system 22.

Each remote access control system 22 is configured to communicate wirelessly and bidirectionally with one of the central wireless communicators 32 of central access control system 20, as shown in FIG. 2 by a double-headed arrow 58 interconnecting central wireless communicator 32 and remote access control system 22. As shown in FIG. 2, each remote access control system 22 includes a remote wireless communicator 60, a remote access controller 62, and a user input device or token reader 64, and lock mechanism 15. The remote wireless communicator 60 is configured to communicate information wirelessly and bidirectionally to/from central wireless communicator 32. Because central and remote wireless communicators 32, 60 communicate wirelessly with one another, each remote access control system 22 can be a standalone unit which is located remotely from central access control system 20, as shown illustratively in FIG. 1. In other words, each remote access control system 22 does not have to be connected to central access control system 20 using hard-wire connections. Therefore, wire for connecting a remote access control system mounted to a door with a central access control system does not have to be pulled in a building where the wireless security control system 10 is installed.

Remote access controller 62 is configured to communicate bidirectionally with remote wireless communicator 60, as shown in FIG. 2 by double-headed arrow 68. Thus, remote access controller 62 can send or receive information to or from central access controller 30 through remote and central wireless communicators 60, 32. This allows remote access controller 62 to send periodic user access information to central access controller 30 while also allowing central access controller 30 to change the programming of remote access controller 62 by, for example, determining which tokens 13 have access to which doors 14.

As shown in FIG. 2, token reader or user input device 64 is adapted to read data stored on token 13 and transmit the data to remote access controller 62. If the data from token 13 is determined by the remote access controller 62 to be valid, the remote access controller 62 will send an “unlock” signal to lock mechanism 15 mounted to door 14. With lock mechanism 15 in an unlocked position, user 12 is able to open door 14. Token reader 64 can be a card reader as shown in FIG. 1, or any other device which interprets token data to permit an authorized user to access a controlled door. For example, token reader 64 may be a keypad configured to receive token or user data by having user 12 key in a particular code, or a fingerprint reader configured to read a user's fingerprint which serves as the user data, or a retinal scanner configured to read a user's retina which serves as the user data. In addition, token reader 64 may be, for example, any of the following types of readers: magnetic stripe, proximity card, smart card, touch memory, and biometric which includes handprint, eye, facial recognition, facial blood flow, and voice.

As mentioned above, information can be communicated wirelessly from central access control system 20 to remote access control system 22 to allow central access control system 20 to program remote access control system 22. Basically, this involves central access controller 30 sending information to remote access controller 62 via central and remote wireless communicators 32, 60. This type of wireless communication allows the remote access control system 22 to be programmed by the central access control system 20 so that remote access controller 62 locks and unlocks door 14 only for approved users 12 having approved tokens 13 as directed by central access controller 30.

Information can also be communicated wirelessly from remote access controller 62 to central access control system 20. This involves a signal being sent from remote access controller 62 to central access controller 30 via remote and central wireless communicators 60, 32. This type of wireless communication allows user access information to be monitored and tracked by passing information received by remote access controller 62 from token reader 64 to central access controller 30.

Figure 3:
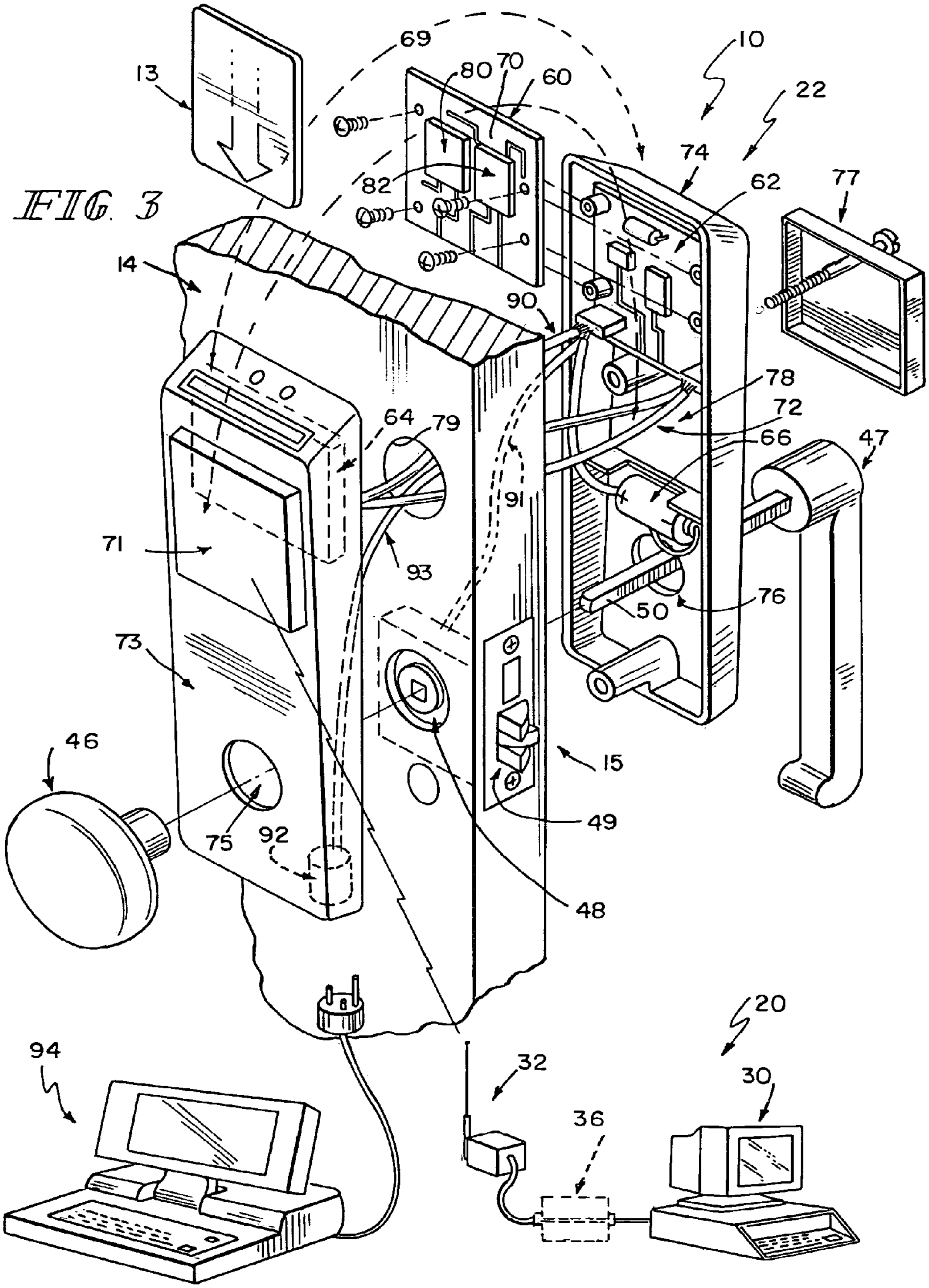
FIG. 3 is a perspective view of the wireless security control system of FIGS. 1 and 2 showing an exploded perspective view of the remote access control system, the remote access control system being configured to communicate wirelessly with the central access control system and through a hard-wired connection with a portable access control system via a local communication port mounted to the remote access controller, and the remote access control system including a housing having a pair of plates positioned on opposite sides of the door to mount the remote access control system to the door.

A preferred embodiment of the wireless security control system 10 is shown in FIG. 3. As shown in FIG. 3, remote access control system 22 of wireless security control system 10 is mounted to door 14 to control the locking and unlocking of lock mechanism 15 which is also mounted to door 14. Remote access control system 22 includes a housing 69 having an outer plate or housing 73 and an inner plate or housing 74. Outer plate 73 mounts token reader 64 and antenna 71 to an exterior side of door 14. Antenna 71 may be mounted to either the interior or exterior side of door 14. Inner plate 74 mounts transmit/receive circuit 70, remote access controller 62, and a battery 66 to an interior side of door 14.

Outer and inner plates 73, 74 are each formed to include an aperture or hole 75, 76, respectively, to accommodate lock mechanism 15, as shown in FIG. 3. Lock mechanism 15 is mounted to door 14 and is used to latch and lock door 14. Lock mechanism 15 includes an outer door handle 46, an inner door handle 47, a latch bolt retractor assembly 48, a latch bolt 49, and a spindle 50. Lock mechanism 15 is operable by means of either outer door handle 46 or inner door handle 47 to operate centrally-located latch bolt refractor assembly 48. The latch bolt retractor assembly 48 is mounted in door 14 and is connected to spring-biased latch bolt 49. Latch bolt refractor assembly 48 is electrically coupled to remote access controller 62 using a wire 91 so that control signals can be sent from remote access controller 62 to latch bolt retractor assembly 48 to move latch bolt retractor assembly 48 between a locked position and an unlocked position. In the unlocked position, latch bolt retractor assembly 48 can be operated by either inner or outer door handle 46, 47 to retract latch bolt 49 from its projected position (shown in FIG. 3) engaging a door frame (not shown) to a retracted position (not shown) lying inside door 14 and disengaging the door frame.

As shown in FIG. 3, spindle 50 is arranged to extend through latch bolt retractor assembly 48 and interconnect outer door handle 46 and inner door handle 47. When latch bolt retractor assembly 48 is in the unlocked position, rotation of either of the door handles 46, 47, rotates spindle 50 to operate latch bolt retractor assembly 48 and move latch bolt 49 from the projected position to the retracted position. Lock mechanism 15 is a mortise lockset. However, lock mechanism 15 could be any type of lock mechanism including, but not limited to: cylindrical lock mechanisms similar to those disclosed in U.S. Pat. Nos. 5,590,555; 5,794,472; 5,421,178; and 4,428,212, which are incorporated herein by reference or mortise lock mechanisms similar to those disclosed in U.S. Pat. Nos. 5,474,348; 4,589,691; and 4,389,061, which are incorporated herein by reference.

Inner plate 74 is also formed to include an opening 78 designed to allow access to various portions of remote access control system 22 during assembly or removal of remote access control system 22 to or from door 14, respectively. A cover (or cap) 77 is configured to cover opening 78 formed in inner plate 74 once remote access control system 22 is mounted to door 14.

Figure 4:
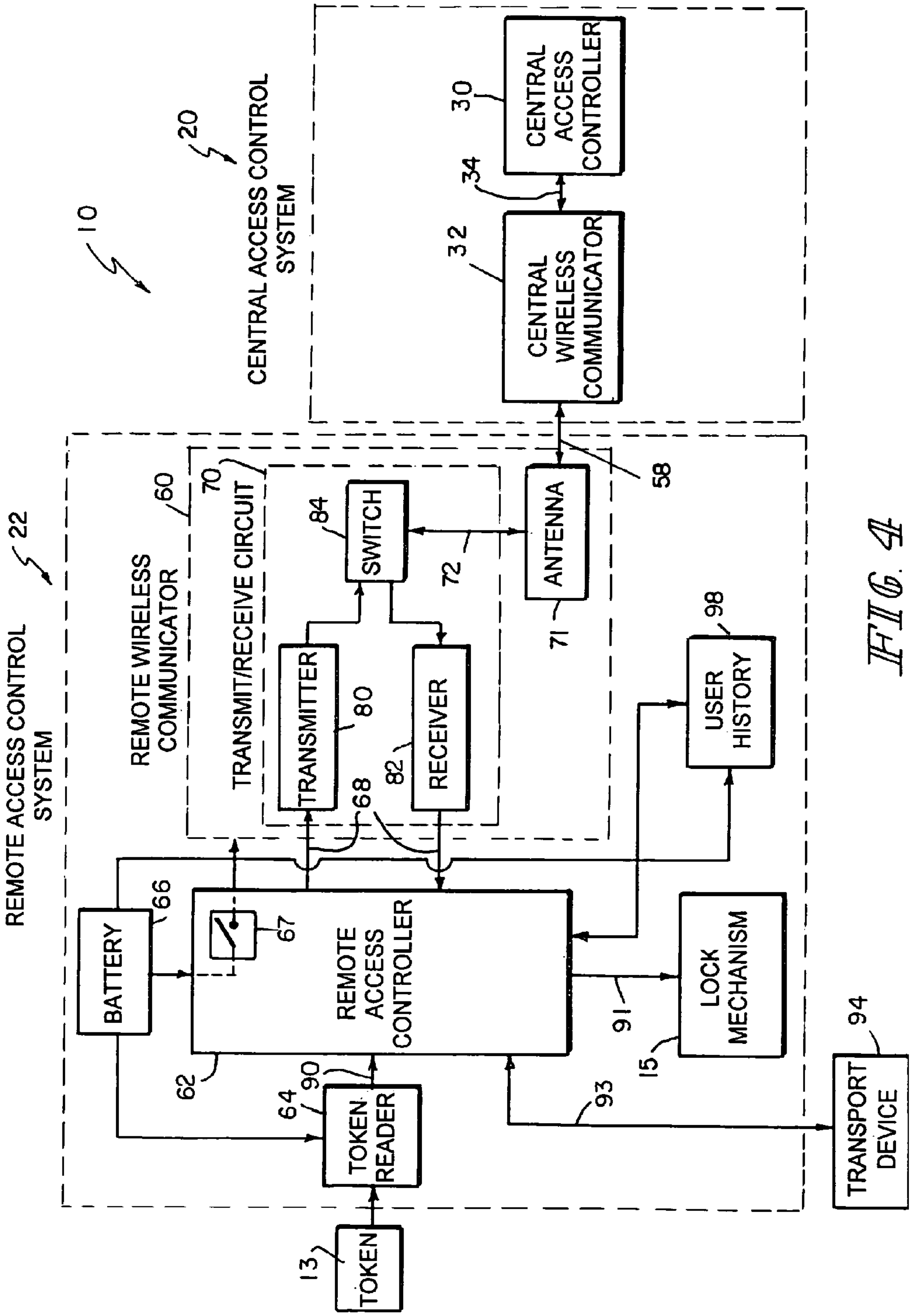
FIG. 4 is a block diagram of the wireless security control system of FIG. 3, showing the remote access control system including the token reader, the remote access controller, the remote wireless communicator, the lock mechanism, a power source, and a user history module, the remote wireless communicator having a transmit/receive circuit and an antenna, the transmit/receive circuit having a transmitter, a receiver, and a switch to allow the remote access controller to communicate wirelessly with the central wireless communicator, and the remote access controller being configured to control the locking and unlocking of the lock mechanism and to communicate with the portable access control system.

As shown in FIG. 3, remote access controller 62 is mounted to inner plate 74 and is electrically coupled to token reader 64 by a wire 90. As discussed above, any suitable token reader may be used. As shown in FIGS. 3 and 4, remote wireless communicator 60 of remote access control system 22 includes a transmit/receive circuit 70, an antenna 71, and a wire 72 electrically interconnecting transmit/receive circuit 70 with antenna 71. As shown in FIG. 3, transmit/receive circuit 70 is mounted to inner plate 74 and antenna 71 is mounted to outer plate 73. Wire 72 extends through a hole 79 in door 14 to interconnect transmit/receive circuit 70 with antenna 71.

Transmit/receive circuit 70 is used to communicate (e.g., transmit and receive) information between remote access controller 62 and central wireless communicator 32 through antenna 71, as shown in FIGS. 3 and 4. As shown in FIG. 4, transmit/receive circuit 70 includes a transmitter 80, a receiver 82, and a switch 84. Transmitter 80 is electrically coupled between remote access controller 62 and switch 84, as shown in FIG. 4, so that remote access controller 62 can transmit information through switch 84 and antenna 71 to central wireless communicator 32. Similarly, receiver 82 is electrically coupled between remote access controller 62 and switch 84 so that wireless information transmitted by central access controller 30 through central wireless communicator 32 can be received by remote access controller 62 through antenna 71 and receiver 82. Switch 84 simply disconnects the path between transmitter 80 and receiver 82 to prevent electrical overload of receiver 82.

Transmitter 80, receiver 82, and antenna 71 can be any variety of devices that cooperate to transmit and receive wireless information. For example, transmitter 80 and receiver 82 could use infrared, ultrasonic, magnetic, or radio frequency (RF). Preferably, as shown in FIGS. 1 and 3, RF technology is used. For RF applications, antenna 71 could be a patch, loop, monopole, dipole whip, printed circuit whip (stub), helical (coil), chip, or slot antenna. As shown in FIGS. 1 and 3, antenna 71 should maintain the aesthetic appeal of the unit while providing adequate RF performance. Switch 84 can also be a wide variety of switches for switching the flow of information from transmit to receive, or vice versa. For example switch 84 could be a specialized RF switch or PIN diodes.

There are many types of RF technology that could be used to configure transmitter 80 and receiver 82 for wireless communication. For example, the following types of RF technology could be used: frequency modulation (FM), amplitude modulation (AM), amplitude shift keying (ASK), frequency shift keying (FSK), phased shift keying (PSK), single band transmission, dual band transmission, and spread spectrum transmission. Spread spectrum technology is resistant to interference, jamming, and multi-path fading. In the preferred embodiment, the 902-928 MHZ frequency range was selected because it is within the FCC spectrum. Spread spectrum technology makes communication between central wireless communicator 32 and remote wireless communicator 60 more reliable than the other RF transmission technologies mentioned above. In preferred embodiments, the present invention uses spread spectrum technology that is commercially available from Intellon Corp., located in Ocala, Fla. Familiar uses of spread spectrum technology include pagers, cordless telephones, and cellular telephones.

Battery 66 is mounted to inner plate 74, as shown in FIG. 3. Battery 66 provides power to remote access controller 62, token reader 64, and user history module 98, as shown in FIGS. 3 and 4. Battery 66 also provides power to remote wireless communicator 60 through remote access controller 62. Remote access controller 62 includes a switch 67, as shown in FIG. 4, to control when power is applied to remote wireless communicator 60. Because battery 66 provides all the power required by remote access control system 22, the expense associated with pulling wires throughout a building to provide power to a remote access control system is eliminated. The remote access control system of the present invention could receive power by being hard-wired to a power source located away from door 14, but one of the cost advantages of remote access control system 22 would be lost by doing so. The major cost advantage is elimination of the wire connection between the remote access control system and the central access control system.

Remote access control system 22 is configured to conserve energy drawn from battery 66. This is done by checking for user updates periodically (once a day, once an hour, etc.) and reporting only high priority events to central access control system 20 on a real-time basis. This contrasts with continuously polling remote access control system 22 and communicating to central access control system 20 every time a decision is to be made.

The security control system 10 of the present invention allows for distributed decision making by having a single central access control system 20 and a plurality of remote access control systems 22. Distributed decision making is possible because each remote access control system 22 decides independently whether a particular user 12 or token 13 is granted or denied access through the door 14 to which remote access control system 22 is coupled. The remote access control system 22 does not need authorization from central access control system 20 before making a decision. Therefore, the distributed decision making capability increases the speed of the decision making process because the remote access control system 22 makes the grant or deny decision locally, at the door 14, without having to communicate with central access control system 20.

The distributed decision making capability of security control system 10 also allows for better degrade mode performance. In other words, the distributed decision making capability prevents a failure of a single component from shutting down the entire security control system 10. For example, by having several remote access control systems 22 that make decisions independently from central access control system 20, the failure of a single component within a single remote access control system 22 or within the central access control system 20 is less likely to shut down the entire security control system 10 than if all the decision making were done by a central access control system.

The distributed decision making capability also minimizes power consumption of battery 66 in a wireless system since the remote access control system or lockset 22 does not have to power up the remote wireless communicator 60 every time a token 13 is presented to remote access control system 22. As mentioned above, remote wireless communicator 60 is powered up by remote access controller 62 only when wireless communication is desired and remains powered down during the normal access grant or deny decision making process. This contrasts with a centralized decision making system where wireless communication would be needed each time a token is presented to a remote lockset which would naturally reduce the life of the battery.

As shown in FIGS. 3 and 4, remote access control system 22 may also include a local communication port 92 mounted to outer plate 73 and electrically coupled to remote access controller 62 by a wire 93 so that a transport device 94 can be connected to remote access control system 22. Transport device 94 is used to transfer information (such as configuration data) from the central access controller 30 to the remote access controller 62. For example, a security administrator would determine the user's access control privileges for a particular remote access control system or lockset 22. This information is normally kept at a central location, such as the central access control system 20. When programming the remote access controller 62 is determined necessary, the administrator would transfer the information to transport device 94 (which could be a laptop, a palmtop, etc.), physically take the transfer device 94 to the remote access control system 22, connect the transport device 94 to the local communication port 92, and transfer data from the transport device 94 to remote access controller 62. Of course, the same data transfer could occur wirelessly through central and remote wireless communicators 32, 60.

Remote access control system 22 may also include a user history module 98, as shown in FIG. 4. User history module 98 allows remote access controller 62 to track information such as which tokens 13 were granted access through which doors 14 on what date and at what time. This user history information from module 98 can then be transmitted to either central access control system 20 or local access control system or transport device 94 on an as-needed basis or on a regularly-scheduled basis (such as once a day, once a week, or once a month).

In operation, user 12 presents user information on a token 13 to token reader 64. Presentation of token 13 to reader 64 is sensed by token reader 64 and activates or "wakes-up" remote access controller 62. An illustrative device for sensing a token reader with a wake-up circuit is disclosed in U.S. patent application Ser. No. 09/243,772 entitled "Proximity Card Detection System," the disclosure of which is incorporated herein by reference. Token 13 is read by token reader 64 and user data (retrieved from the token) is sent to remote access controller 62. Remote access controller 62 evaluates the user data and performs an access grant or deny decision. If an access grant decision is made, remote access controller 62 applies an unlocking signal to lock mechanism 15 and allows user 12 to gain access through door 14. After a predetermined period of time, a locking signal is applied to lock mechanism 15 to re-lock door 14. If an access deny decision is made, no action is taken on lock mechanism 15. The results of the transaction are stored in user history 98 contained in remote access controller 62.

On a predetermined time period (minute, hour, day, week), remote access controller 62 is activated by a real-time clock. Activation of remote access controller 62 for this particular reason initiates a data transfer via RF from remote access control system 22 to central access control system 20. Remote access control system 22 inquires for any updates to the user database and transfers any transaction history events requested by central access control system 20.

In the case of user updates, remote access control system 22 switches into the RF receive mode and processes data received from central access control system 20. This data is transferred into the user memory 98 of remote access control system 22 and stored. If central access control system 20 requested history transaction information, remote access control system 22 recalls information from the history or user memory 98 and transmits the data via RF to central access control system 20.

When data transmission from remote access control system 22 to central access control system 20 is desired, data from remote access controller 62 is processed and modulated using spread spectrum techniques and communicated through antenna 71. This data is received by central wireless communicator 32 and demodulated back into a digital data stream. This data stream is passed along to central access controller 30 and processed. Information is passed along via a series of commands and protocols similar to those used by LAN networks, as described above.

Conversely, when central access controller 30 wishes to communicate with remote access controller 62, a data stream is transmitted from central access controller 30 to central wireless communicator 32. The data is modulated using spread spectrum techniques and communicated through central wireless communicator 32. This data is received by remote wireless communicator 60 and demodulated back into a digital data stream. This data stream is passed along to remote access controller 62 and processed.

By combining RF wireless technology with a battery powered access control system, the elimination of wires in standard access control products is eliminated or greatly reduced. Additionally, because remote access controller 62 contains intelligence, remote access controller 62 can make all access control decisions at the door. This intelligence eliminates the need to transmit and/or receive data via RF for each event that occurs at the door. This feature greatly reduces the amount of power draw required by a battery powered device.

Although the invention has been described in detail with reference to certain preferred embodiments, variations and modifications exist within the scope and spirit of the invention as described and defined in the following claims.

The invention claimed is:

1. A building including an interior region, a plurality of doors installed in the interior region of the building, the plurality of doors being moveable between opened and closed positions controlling access to portions of the interior region of the building, a plurality of remote access control systems positioned adjacent to the plurality of doors to control access through the plurality of doors to the portions of the interior region of the building by controlling the locking and unlocking of the respective door, a plurality of central wireless communicators installed in the interior region of the building, and a central controller communicating access information to the plurality of central wireless communicators, the plurality of central wireless communicators receiving at least a portion of the access information communicated from the central controller, the plurality of central wireless communicators wirelessly transmitting wireless signals including at least a portion of the access information to the plurality of remote access control systems, the wireless signals originating within the interior region of the building, the wireless signals being transmitted prior to a user associated with the access information making an attempt to unlock a respective door, each of the remote access control systems being configured to receive the wireless signals and store at least some of the access information from the central controller, each of the remote access control systems being configured to control the locking and unlocking of the respective door using the access information stored therein, each of the plurality of remote access control systems making a decision whether to unlock the respective door in response to a user making an attempt to unlock the door based on the access information stored therein and without having to further communicate with the central controller.

2. The building of claim 1, wherein each of the remote access control systems includes an antenna, an access controller, and a receiver that is electrically coupled to the antenna and that communicates the wireless information received by the antenna to the access controller.

3. The building of claim 1, wherein each of the remote access control systems is further adapted to transmit wireless information to at least one of the central wireless communicators installed within the interior region of the building.

4. The building of claim 1, wherein the central controller is installed within the interior region of the building.

5. The building of claim 1, wherein at least one of the remote access control systems periodically initiates wireless communication with the central controller and the central controller transmits user updates to the at least one remote access control system in response to the wireless communication periodically initiated by the at least one remote access controller.

6. The building of claim 1, wherein each of the remote access control systems is adapted to receive spread-spectrum RF infatuation.

7. The building of claim 1, wherein each of the remote access control systems comprises a reader adapted to read user data when presented to the reader, a remote access controller electrically coupled to the reader, the remote access controller being configured to determine whether the user data is valid and being adapted to unlock the lock if the data is valid, and a remote wireless communicator electrically coupled to the remote access controller, the remote wireless communicator being adapted to communicate information wirelessly between the remote access controller and the central controller.

8. The building of claim 7, wherein each of the remote access control systems is further adapted to transmit RF information.

9. The building of claim 7, wherein each of the remote access control systems further comprises a battery coupled to the respective reader, the respective remote access controller, and the respective remote wireless communicator.

10. The building of claim 7, wherein the user data is stored on tokens, each of the remote access control systems is adapted to store user history information regarding which tokens were granted access, and each of the remote access control systems is configured to transmit the user history information to the central controller on one of an as-needed basis and a regularly-scheduled basis.

11. The building of claim 7, wherein each of the remote access control systems is further adapted to transmit RF information.

12. The building of claim 1, wherein at least one of the remote access control systems periodically initiates a data transfer with the central controller so that user updates are transmitted to the at least one remote access control system by the central controller and so that user history information is transmitted to the central controller by the at least one remote access control system.

13. The building of claim 1, wherein each central wireless communicator is designated to communicate wirelessly with an associated one of the remote access control systems.

14. The building of claim 1, wherein the plurality of remote access control systems receive power from the building.

15. A building including an interior region, a plurality of doors installed in at least one wall of the building, the plurality of doors being moveable between opened and closed positions controlling access to portions of the interior region of the building, a plurality of remote access control systems positioned adjacent to the plurality of doors to control access through the plurality of doors to the portions of the interior region of the building by controlling the locking and unlocking of the respective door, a plurality of central wireless communicators installed in the interior region of the building, and a central controller installed in the interior region of the building, the central controller communicating access information to the plurality of central wireless communicators, the plurality of central wireless communicators receiving at least a portion of the access information communicated from the central controller, the plurality of central wireless communicators wirelessly transmitting wireless signals including at least a portion of the access information to the plurality of remote access control systems, the wireless signals being transmitted prior to a user associated with the access information making an attempt to unlock a respective door, each of the remote access control systems being configured to receive the wireless signals and store at least some of the access information from the central controller, each of the remote access control systems being configured to control the locking and unlocking of the respective door using the access information stored therein, each of the plurality of remote access control systems making a decision whether to unlock the respective door in response to a user making an attempt to unlock the door based on the access information stored therein and without having to further communicate with the central controller.

16. The building of claim 15, wherein each of the remote access control systems includes an antenna, an access controller, and a receiver that is electrically coupled to the antenna and that communicates the wireless information received by the antenna to the access controller.

17. The building of claim 15, wherein each of the remote access control systems is further adapted to transmit wireless information to at least one of the central wireless communicators installed within the interior region of the building.

18. The building of claim 15, wherein the wireless signals communicated by plurality of central wireless communicators originate within the building.

19. The building of claim 15, wherein at least one of the remote access control systems periodically initiates wireless communication with the central controller and the central controller transmits user updates to the at least one remote access control system in response to the wireless communication periodically initiated by the at least one remote access controller.

20. The building of claim 15, wherein each of the remote access control systems is adapted to receive spread-spectrum RF information.

21. The building of claim 15, wherein each of the remote access control systems comprises a reader adapted to read user data when presented to the reader, a remote access controller electrically coupled to the reader, the remote access controller being configured to determine whether the user data is valid and being adapted to unlock the lock if the data is valid, and a remote wireless communicator electrically coupled to the remote access controller, the remote wireless communicator being adapted to communicate information wirelessly between the remote access controller and the central controller.

22. The building of claim 21, wherein each of the remote access control systems further comprises a battery coupled to the respective reader, the respective remote access controller, and the respective remote wireless communicator.

23. The building of claim 21, wherein the user data is stored on tokens, each of the remote access control systems is adapted to store user history information regarding which tokens were granted access, and each of the remote access control systems is configured to transmit the user history information to the central controller on one of an as-needed basis and a regularly-scheduled basis.

24. The building of claim 15, wherein at least one of the remote access control systems periodically initiates a data transfer with the central controller so that user updates are transmitted to the at least one remote access control system by the central controller and so that user history information is transmitted to the central controller by the at least one remote access control system.

25. The building of claim 15, wherein each central wireless communicator is designated to communicate wirelessly with an associated one of the remote access control systems.

26. The building of claim 15, wherein the plurality of remote access control systems receive power from the building.

* * * * *